(12) United States Patent
Li et al.

(10) Patent No.: US 9,724,687 B2
(45) Date of Patent: Aug. 8, 2017

(54) METHOD FOR REGENERATION OF ION EXCHANGE RESIN CAUSING REDUCTION OF DESORPTION SOLUTION

(71) Applicants: Nanjing University, Nanjing (CN); Nanjing University & Yancheng Academy of Environmental Protection Technology and Engineering, Yancheng (CN)

(72) Inventors: Aimin Li, Nanjing (CN); Zixiao Xu, Nanjing (CN); Bicun Jiang, Yancheng (CN); Chendong Shuang, Nanjing (CN); Qing Zhou, Nanjing (CN); Wentao Li, Nanjing (CN); Xinchun Ding, Yancheng (CN); Yeli Jiang, Nanjing (CN); Mengqiao Wang, Najing (CN); Ke Shen, Nanjing (CN); Weiwei Zhou, Nanjing (CN)

(73) Assignees: Nanjing University, Nanjing (CN); Nanjing University & Yancheng Academy of Environmental Protection Technology and Engineering, Yancheng (CN)

( * ) Notice: Subject to any disclaimer, the term of this patent is extended or adjusted under 35 U.S.C. 154(b) by 17 days.

(21) Appl. No.: 14/911,994

(22) PCT Filed: Aug. 8, 2014

(86) PCT No.: PCT/CN2014/083984
§ 371 (c)(1),
(2) Date: Feb. 12, 2016

(87) PCT Pub. No.: WO2015/021884
PCT Pub. Date: Feb. 19, 2015

(65) Prior Publication Data
US 2016/0193600 A1   Jul. 7, 2016

(30) Foreign Application Priority Data
Aug. 14, 2013 (CN) .......................... 2013 1 0352208

(51) Int. Cl.
| | | |
|---|---|---|
| B01J 20/34 | (2006.01) | |
| B01J 49/00 | (2017.01) | |
| B01J 49/50 | (2017.01) | |
| C02F 1/42 | (2006.01) | |
| C02F 1/52 | (2006.01) | |

(52) U.S. Cl.
CPC ........... *B01J 49/0065* (2013.01); *B01J 49/50* (2017.01); *C02F 1/42* (2013.01); *C02F 1/52* (2013.01); *C02F 2303/16* (2013.01)

(58) Field of Classification Search
CPC ............ B01J 20/34; B01J 29/90; B01J 31/20
USPC ............................................... 502/34, 22, 24
See application file for complete search history.

(56) References Cited

U.S. PATENT DOCUMENTS

2016/0193600 A1\* 7/2016 Li ........................ B01J 49/0065
502/25

\* cited by examiner

*Primary Examiner* — Edward Johnson
(74) *Attorney, Agent, or Firm* — Tian IP & Technology, LLC.

(57) ABSTRACT

Implementations herein relate to methods for reducing a desorption solution for regeneration of ion exchange resins in the field of regeneration of resins. The implementations solve problems related to low utilization rates of regeneration agents and high volumes of desorption solutions during the desorption process. The implementations include regenerating the ion exchange resins, and the regeneration solution becomes the desorption solution. After coagulating sedimentation of the desorption solution and slurry separation, a large amount of organic contents are removed from coagulation serum and a large amount of regenerate agents are left. The implementations further include adding the regeneration agent to the coagulation serum to form new or refreshed regeneration solution to regenerate the ion exchange resins. Accordingly, the coagulation serum may be generated from the desorption solution. These operations may be repeated multiple batches for resin regeneration.

7 Claims, 1 Drawing Sheet

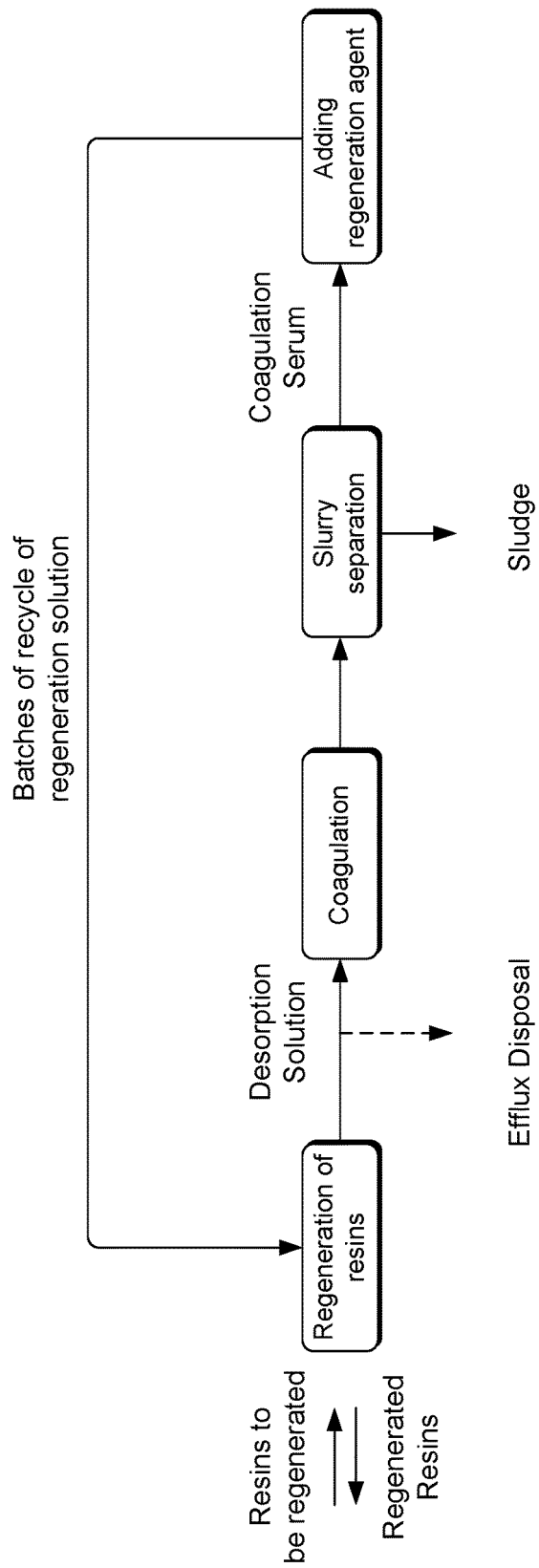

METHOD FOR REGENERATION OF ION EXCHANGE RESIN CAUSING REDUCTION OF DESORPTION SOLUTION

CROSS REFERENCE TO RELATED APPLICATION

This application is a national stage application of International application number PCT/CN2014/083984, filed on Aug. 8, 2014, titled "Method for Regeneration of Ion Exchange Resin Causing Reduction of Desorption Solution," which claims the priority benefit of Chinese Patent Application No. 201310352208.5, filed on Aug. 14, 2013, which is hereby incorporated by reference in its entirety.

TECHNICAL FIELD

Implementations herein relate to regeneration of resins, and more particularly to methods for reducing a desorption solution for regeneration of ion exchange resins. The implementations reduce an amount of the desorption solution to $1/3 \sim 1/31$ of those generated using conventional techniques.

BACKGROUND

China has a large amount of water resources, has 7% of the total reserves of global water resources, and ranks sixth in the world. But water in China is also extremely scarce for individual people. For example, water resources per capita are only a quarter of the world average. Also, water resources are unevenly distributed, namely, the south having a plenty of water with poor quality and the north having less water and fewer water resources. With rapid economic development, water shortages have become increasingly prominent. For example, problems related to the water shortages include water waste, utilization rate and gradual deterioration of water pollution. Water resources and water security have become an important factor restricting economic development. Therefore, new unconventional water resources are needed.

Sewage and wastewater may be used as an effective way to effectively alleviate water shortage problems. Compared with other wastewater, wastewater from large urban has some unique advantages with respect to potential for the second water resources. For example, such wastewater is stable, has reliable water supplies, is less effected by seasons and climate, is closed to processing facilities, and has low cost.

After primary and secondary biological degradations, organic contents are referred as secondary effluent organic matter (i.e., EfOM). Composition of EfOM is very complex, and usually includes residual biochemical degradation of organic compounds, natural organic, synthetic refractory organics, microbial products (SMP), disinfection by-products and organic substances that are not yet identifiable. EfOM often makes the secondary effluent to fail to reach the requirement of recycled water; therefore, deep purification is needed.

There are many ways for the deep purification. Depending on the nature of a process, the deep purification may be divided into three types: physical, chemical and biological. Physical methods include adsorption (mainly carbon adsorption) method and membrane filtration method, etc. Chemical methods include chemical coagulation methods, advanced oxidation, ion exchange, etc. Biological methods include biological biofilms such as biofilm membrane filtration methods.

Ion exchange may be used to remove charged organics from wastewater. Secondary effluent of EfOM mostly are negatively charged surface after biochemical systems; therefore, anion exchange resins are used more widely.

Anion exchange resins with magnetic fields have been used recently (e.g., resins made by an Australian company Orica (MIEX) and by Nanjing University (NDMP)). These new techniques not only overcome shortcomings of conventional fixed-bed resins, but also have additional features such as a small size, a fast mass transferring rate, and good performance of sedimentation. This greatly expands applications of resin technology, and therefore anion exchange resins with magnetic fields are used to purify drinking water and sewage. When ion exchange resins purify water, they effectively remove EfOM and other organic matters, greatly reducing generation of disinfection byproducts. Ion exchange resins may also remove ammonia nitrogen, total phosphorus, fluoride, bromide, nitrate, nitrite etc.

However, water treatment processes using ion exchange resins produce a small amount of resin desorption solutions. In general, amounts of desorption solutions vary depending on types of water and range from 0.2-10% of the amount of the water to be processed. In general, drinking water has low-yield desorption solution while wastewater has high-yield desorption solution. Desorption solutions have complex compositions such as high concentrations of organic matters, high salt contents, deep colors, and poor biodegradability characteristics, and therefore their treatment is difficult.

At present, commonly used methods of treating desorption solutions include disposal landfill, incineration concentrated evaporation, and advanced oxidation techniques. These techniques are expensive and therefore limit applications of ion exchange technology in the field of water treatment. Currently, conventional techniques include regeneration of ion exchange resin using a mixture of resins to be regenerated and a regeneration solution by a volume ratio (typically 1:1). Then desorption solution of the regeneration is disposed. Regeneration agents left in the desorption solution has not been fully utilized and also increase the difficulty of treating the desorption solution. At present, a desorption solution using conventional techniques is about 0.2 to 10% of the water to be processed. A large scale of processing of municipal drinking water and wastewater will generate a large amount of desorption solutions. This greatly limits applications of ion exchange technology in the field of water treatment.

A solution to reduce volumes of desorption solutions produced by ion exchange technology and therefore reduce the costs associated with treatment of the desorption solutions is needed.

SUMMARY

1. Implementations may solve problems of existing ion exchange resins used in the field of water deep purification. Under conventional techniques, while ion exchange resins may be regenerated, such regeneration may produce a certain amount of resin desorption solution containing high concentrations of organic matters, and high salt contents that have poor biodegradability. Usually a volume of the resin desorption solution is about 0.2-10% of water to be purified. Therefore, this kind of desorption process is difficult to performed and has high costs, limiting wide applications of ion exchange resins in the area of water purification. Implementations herein relate to methods for reducing a desorption solution for regeneration of ion exchange resins. The implementations solve problems related to low utilization rates of regeneration agents and high volumes of desorption solutions during the desorption process. With proper coagulation methods, organic contents in the resin desorption solution are greatly reduced, and the amount of the regeneration agent in the resin desorption solution is not reduced. After adding a certain amount of one or more regeneration agents, the implementations regenerate the ion exchange resins and apply multiple batches to the desorption process such as to reduce an amount of disposed desorption solutions. For example, the implementations may reduce the amount of desorption solution to from ⅓ to ⅟₃₁ of those generated using conventional techniques. This greatly reduces disposal costs related to treatment of the desorption solution.

2. To solve the above problems, the implementations provide the following operations. The implementations include a method for reducing a desorption solution for regeneration of ion exchange resins.

(a) mixing a regeneration solution and resins to be regenerated for about 10-120 minutes to regenerate the ion exchange resins. The regeneration solution becomes the desorption solution;

(b) adding a coagulant to the desorption solution to perform coagulating sedimentation;

(c) performing a slurry separation on the desorption solution after the coagulating sedimentation to form a coagulation serum and generate an amount of sludge that is disposed;

(d) adding an amount of a regeneration agent to the coagulation serum to form the regeneration solution;

(e) performing operations of the step (a) using the regeneration solution formed in the step (d) to regenerate the ion exchange resins;

(f) repeating multiple batches of the steps (a) to (e). In response to a determination that the regeneration solution fails to satisfy a predetermined condition, disposing the desorption solution.

In some implementations, in the step (b), the coagulant may include at least one of PAC, aluminum sulfate, ferric chloride polymerization, PFS, or polyacrylamide.

In some implementations, in the step (b), a dosage of the coagulant dosage is about 100-5000 mg/L.

In some implementations, in the step (c), a ratio between a volume of the coagulation serum and a volume of the desorption solution is about from 80 to 99.5%.

In some implementations, in the step (d), the added regeneration agent may include at least one of sodium bicarbonate, sodium chloride, sodium hydroxide, potassium hydroxide, or potassium chloride.

In some implementations, in the step (d), the amount of the added regeneration agent is 5-40% of an amount of the regeneration solution.

In some implementations, in the step (f), the number of the plurality of batches is 2-30.

3. Compared to conventional techniques, the beneficial effects of the present invention are as follows.

(1) The implementations reduce volumes of desorption solution produced by ion exchange resins used in the field of water deep purification. The implementations include adding a coagulant to the desorption solution to perform coagulating sedimentation and slurry separation (e.g., solid-liquid separation) during the regeneration of the ion exchange resins. This greatly reduces an amount of organic contents without changing an amount of the regeneration agent in the coagulation serum. The implementations further include adding the regeneration agent to the coagulation serum to form new or refreshed regeneration solution to regenerate the ion exchange resins and to produce the desorption solution on which the coagulating sedimentation may be perform. These operations may be repeated multiple batches. The desorption solution may be disposed when the coagulation solution fails to satisfy a predetermined condition.

(2) The implementations further include repeating the regeneration process, as described above, multiple batches such as to reduce the amount of the desorption solution to from ⅓ to ⅟₃₁ of those generated using conventional techniques. This greatly reduces disposal costs related to the desorption solution, reduces technical costs, and protects environment.

(3) The implementations may be applied widely to regeneration processes of ion exchange resins in the field of water deep purification.

(4) The implementations change conventional techniques relate to methods for reducing a desorption solution for regeneration of ion exchange resins such as not only improve higher economic efficiency, but also achieve good social benefits and have significant impact on resin regeneration techniques.

BRIEF DESCRIPTION OF THE DRAWINGS

FIG. 1 is a flow diagram in accordance with one or more embodiments of the present disclosure.

DETAILED DESCRIPTION OF THE PREFERRED EMBODIMENTS

Below embodiments and/or example of the present disclosure are further described.

Example 1

Drinking water was processed using conventional techniques and then processed using ion exchange resins to perform deep purification of water. As illustrated in FIG. 1, the ion exchange resins may be regenerated after treatment of a certain amount of water. At normal temperature and pressure, the ion exchange resins were regenerated using a regeneration solution containing 35% NaCl for about 30 minutes. After the regeneration, the regeneration solution became a desorption solution in which the concentration of TOC is about 2116 mg/L and an amount of NaCl is about 16.8%.

The desorption solution was placed in a coagulation tank, was added Polyaluminium Chloride (PAC) 1000 mg/L for stirred coagulation, and was left for settlement for about 2 hours. Sludge at the bottom of the coagulation tank was filtered using a pressure filter and a volume of the dry sludge is about 1.0%. The pressure sludge filtrate and the coagulation serum were placed into a tank for the regeneration solution. A removal rate of TOC using the coagulation is about 41%, a concentration of TOC in the pressure sludge filtrate and the coagulation serum is about 1250 mg/L and an amount of NaCl is about 16.8%.

A certain amount of NaCl regeneration solution was added to the tank for the regeneration solution such that the amount of NaCl is about 33% and the concentration of TOC is still about 1250 mg/L in the newly made regeneration solution.

The regeneration solution was then placed into the ion exchange resins to resin regeneration. Accordingly, the newly produced desorption solution generated by coagulation was added NaCl regeneration solution to regenerate the ion exchange resins for three batches. The desorption solution desorbed organic contents from the ion exchange resins, and TOC values of the organic contents were 1830 mg/L, 1518 mg/L, and 1208 mg/L, respectively. After three batches, the regeneration rate of the regeneration solution was less than 60% and the current regeneration solution was capable of desorbing organic contents having a TOC value of 1208 mg/L. The desorption solution was then drained away. At this point, the amount of the desorption solution was reduced to ¼ of those produced by conventional techniques.

Example 2

Operating conditions of Example 2 is similar to those of Example 1. The desorption solution was placed in a coagulation tank and was added PAC to reach 3000 mg/L of PAC. After coagulation, a TOC removal rate of the desorption solution is about 52%. After coagulation of the desorption solution, the regeneration solution was made and four batches were applied. The desorption solution desorbed organic contents from the ion exchange resins, and TOC values of the organic contents were 2120 mg/L, 1918 mg/L, 1695 mg/L, 1456 mg/L, and 1210 mg/L, respectively. After four batches, the regeneration rate of the regeneration solution was less than 60% and the desorption solution was then drained away. At this point, the amount of the desorption solution was reduced to ⅕ of those produced by conventional techniques.

Example 3

Operating conditions of Example 3 is similar to those of Example 1. The desorption solution was placed in a coagulation tank and was added polymeric ferric chloride to have a concentration of 1000 mg/L of polymeric ferric chloride. After coagulation, a TOC removal rate of the desorption solution is about 62%. After coagulation of the desorption solution, the regeneration solution was made and five batches were applied. The desorption solution desorbed organic contents from the ion exchange resins, and TOC values of the organic contents were 2118 mg/L, 1940 mg/L, 1788 mg/L, 1590 mg/L, 1478 mg/L, and 1245 mg/L, respectively. After five batches, the regeneration rate of the regeneration solution was less than 60% and the desorption solution was then drained away. At this point, the amount of the desorption solution was reduced to ⅙ of those produced by conventional techniques.

Example 4

Operating conditions of Example 4 is similar to those of Example 3. The desorption solution was placed in a coagulation tank and was added polymeric ferric chloride 3000 mg/L. After coagulation, a TOC removal rate of the desorption solution is about 76%. After coagulation of the desorption solution, the regeneration solution was made and seven batches were applied. The desorption solution desorbed organic contents from the ion exchange resins, and TOC values of the organic contents were 2125 mg/L, 2018 mg/L, 1902 mg/L, 1785 mg/L, 1656 mg/L, 1538 mg/L, 1390 mg/L, 1235 mg/L, respectively. After seven batches, the regeneration rate of the regeneration solution was less than 60% and the desorption solution was then drained away. At this point, the amount of the desorption solution was reduced to ⅛ of those produced by conventional techniques.

Example 5

Drinking water was processed using conventional techniques and then processed using ion exchange resins to perform deep purification. At normal temperature and pressure, the ion exchange resins were regenerated using a regeneration solution containing 35% NaCl for about 30 minutes. After the regeneration, the regeneration solution became a desorption solution in which the concentration of CODcr is about 7218 mg/L and an amount of NaCl is about 14.6%.

The desorption solution was placed in a coagulation tank, was added PAC to have a concentration of 1000 mg/L of PAC for stirred coagulation, and was left to settle for about 2 hours. Sludge at the bottom of the coagulation tank was filtered using a pressure filter and a volume of the dry sludge is about 1.5%. The pressure sludge filtrate and the coagulation serum were placed into a tank for the regeneration solution. A removal rate of CODcr using the coagulation is about 42%, a concentration of CODcr in the pressure sludge filtrate and the coagulation serum is about 4186 mg/L and an amount of NaCl is about 14.6%.

A certain amount of NaCl regeneration solution was added to the tank for the regeneration solution such that the amount of NaCl is about 33% and the concentration of CODcr is still about 4186 mg/L in the newly made regeneration solution.

The regeneration solution was then placed into the ion exchange resins to resin regeneration. Accordingly, the newly produced desorption solution generated by coagulation was added NaCl regeneration solution. The ion exchange resins were regenerated and two batches were applied. The desorption solution desorbed organic contents from the ion exchange resins, and CODcr values of the organic contents were 5930 mg/L and 4335 mg/L. After two batches, the regeneration rate of the regeneration solution was less than 60% and the current regeneration solution was capable of desorbing organic contents having a CODcr value of 4335 mg/L. The desorption solution was then drained away. At this point, the amount of the desorption solution was reduced to ⅓ of those produced by conventional techniques.

Example 6

Operating conditions of Example 6 is similar to those of Example 5. The desorption solution was placed in a coagulation tank and was added PAC to have a concentration of 3000 mg/L of PAC. After coagulation, a CODcr removal rate of the desorption solution is about 53%. After coagulation of the desorption solution, the regeneration solution was made and three batches were applied. The desorption solution desorbed organic contents from the ion exchange resins, and CODcr values of the organic contents were 7230 mg/L, 6520 mg/L, 5542 mg/L, and 4360 mg/L, respectively. After three batches, the regeneration rate of the regeneration solution was less than 60% and the desorption solution was then drained away. At this point, the amount of the desorption solution was reduced to ¼ of those produced by conventional techniques.

Example 7

Operating conditions of Example 7 is similar to those of Example 5. The desorption solution was placed in a coagulation tank and was added polymeric ferric chloride to have a concentration of 1000 mg/L of polymeric ferric chloride. After coagulation, a CODcr removal rate of the desorption solution is about 61%. After coagulation of the desorption solution, the regeneration solution was made and four batches were applied. The desorption solution desorbed organic contents from the ion exchange resins, and CODcr values of the organic contents were 7220 mg/L, 6721 mg/L, 6070 mg/L, 5290 mg/L, and 4338 mg/L, respectively. After four batches, the regeneration rate of the regeneration solution was less than 60% and the desorption solution was then drained away. At this point, the amount of the desorption solution was reduced to ⅕ of those produced by conventional techniques.

Example 8

Operating conditions of Example 8 is similar to those of Example 7. The desorption solution was placed in a coagulation tank and was added polymeric ferric chloride 3000 mg/L. After coagulation, a CODcr removal rate of the desorption solution is about 75%. After coagulation of the desorption solution, the regeneration solution was made and five batches were applied. The desorption solution desorbed organic contents from the ion exchange resins, and TOC values of the organic contents were 7216 mg/L, 6805 mg/L, 6366 mg/L, 5720 mg/L, 5080 mg/L, 4315 mg/L, respectively. After five batches, the regeneration rate of the regeneration solution was less than 60% and the desorption solution was then drained away. At this point, the amount of the desorption solution was reduced to ⅙ of those produced by conventional techniques.

Example 9

Wastewater was processed using conventional techniques and then processed using ion exchange resins to perform deep purification. As illustrated in FIG. 1, the ion exchange resins may be regenerated after treatment of a certain amount of water.

(a) At normal temperature and pressure, the ion exchange resins were regenerated by mixing ion exchange resins to be generated and a regeneration solution containing 35% NaCl for about 10 minutes. The ion exchange resins were regenerated and the regeneration solution became the desorption solution.

(b) adding a coagulant to the desorption solution to perform coagulating sedimentation. The desorption solution was added polymeric ferric chloride to have a concentration of 100 mg/L of polymeric ferric chloride.

(c) performing a slurry separation on the desorption solution after the coagulating sedimentation to form a coagulation serum and generate an amount of sludge that is disposed. A ratio between a volume of the coagulation serum and a volume of the desorption solution is about 99.5%.

(d) adding an amount of a regeneration agent to the coagulation serum to form the regeneration solution. The regeneration agent is potassium chloride and the amount of the added regeneration agent is about 5% of an amount of the regeneration solution.

(e) performing operations of the step (a) using the regeneration solution formed in the step (d) to regenerate the ion exchange resins.

(f) repeating two batches of the steps (a) to (e). In response to a determination that the regeneration solution fails to satisfy a predetermined condition, disposing the desorption solution.

Example 10

Operating conditions of Example 10 is similar to those of Example 9. At step (a), at normal temperature and pressure, the ion exchange resins were regenerated by mixing ion exchange resins to be generated and a regeneration solution containing 36% Sodium bicarbonate for about 60 minutes. At step (b), the desorption solution was added aluminum sulfate to have a concentration of 2000 mg/L of aluminum sulfate. In step (c), a ratio between a volume of the coagulation serum and a volume of the desorption solution is about 93%. At step (d), the amount of the added regeneration agent is about 30% of an amount of the regeneration solution. The number of multiple batches is 8.

Example 11

Operating conditions of Example 11 is similar to those of Example 9. At step (a), at normal temperature and pressure, the ion exchange resins were regenerated by mixing ion exchange resins to be generated and a regeneration solution containing potassium hydroxide for about 120 minutes. At step (b), the desorption solution was added PAC to have a concentration of 5000 mg/L of PAC. In step (c), a ratio between a volume of the coagulation serum and a volume of the desorption solution is about 80%. At step (d), the amount of the added regeneration agent is about 40% of an amount of the regeneration solution. The number of multiple batches is 30.

Example 12

Operating conditions of Example 12 is similar to those of Example 9. At step (a), at normal temperature and pressure, the ion exchange resins were regenerated by mixing ion exchange resins to be generated and a regeneration solution containing sodium hydroxide for about 100 minutes. At step (b), the desorption solution was added polyacrylamide to have a concentration of 100 mg/L of polyacrylamide. In step (c), a ratio between a volume of the coagulation serum and a volume of the desorption solution is about 86%. At step (d), the amount of the added regeneration agent is about 5% of an amount of the regeneration solution. The number of multiple batches is 13.

Example 13

Operating conditions of Example 13 is similar to those of Example 9. At step (a), at normal temperature and pressure, the ion exchange resins were regenerated by mixing ion exchange resins to be generated and a regeneration solution containing a mixture of sodium chloride, potassium chloride, sodium bicarbonate, sodium hydroxide and potassium hydroxide for about 110 minutes. A mass ratio of sodium chloride, potassium chloride, sodium bicarbonate, sodium hydroxide and potassium hydroxide in the mixture is 5:5:5:5:1, respectively. At step (b), the desorption solution was added a mixture of PAC, aluminum sulfate, ferric chloride polymerization, PFS and polyacrylamide to have a concentration of 4000 mg/L of the mixture. A mass ratio of PAC, aluminum sulfate, ferric chloride polymerization, PFS and polyacrylamide in the mixture is 10:10:10:10:1, respectively. In step (c), a ratio between a volume of the coagulation serum and a volume of the desorption solution is about 91%. At step (d), the amount of the added regeneration agent is about 15% of an amount of the regeneration solution. The number of multiple batches is 9.

Example 14

Operating conditions of Example 12 is similar to those of Example 9. At step (a), at normal temperature and pressure, the ion exchange resins were regenerated by mixing ion exchange resins to be generated and a regeneration solution containing a mixture of sodium chloride, sodium bicarbonate, and sodium hydroxide for about 75 minutes. A mass ratio of sodium chloride, sodium bicarbonate, and sodium hydroxide in the mixture is 10:5:1, respectively. At step (b), the desorption solution was added a mixture of ferric chloride polymerization, PAC, and polypropylene amide to have a concentration of 2800 mg/L of the mixture. A mass ratio of ferric chloride polymerization, PAC, and polypropylene amide in the mixture is 20:5:1, respectively. In step (c), a ratio between a volume of the coagulation serum and a volume of the desorption solution is about 87%. At step (d), the amount of the added regeneration agent is about 10% of an amount of the regeneration solution. The number of multiple batches is 15.

What is claimed is:

1. A method for reducing a desorption solution for regeneration of ion exchange resins, the method comprising:
   (a) mixing a regeneration solution and the ion exchange resins for about 10-120 minutes to regenerate the ion exchange resins, the regeneration solution becoming the desorption solution;
   (b) adding a coagulant to the desorption solution to perform coagulating sedimentation;
   (c) performing a slurry separation on the desorption solution after the coagulating sedimentation to form a coagulation serum and to generate an amount of sludge that is disposed;
   (d) adding an amount of a regeneration agent to the coagulation serum to form modified regeneration solution;
   (e) performing operations of the step (a) using the modified regeneration solution formed in the step (d) to regenerate the ion exchange resins;
   (f) repeating a plurality of batches of the steps (a) to (e); and
   in response to a determination that the regeneration solution fails to satisfy a predetermined condition, disposing the desorption solution.

2. The method of claim 1, wherein the coagulant comprises at least one of PAC, aluminum sulfate, ferric chloride polymerization, PFS, or polyacrylamide.

3. The method of claim 1, wherein a dosage of the coagulant dosage is about 100-5000 mg/L.

4. The method of claim 1, wherein a ratio between a volume of the coagulation serum and a volume of the desorption solution is about from 80 to 99.5%.

5. The method of claim 1, wherein the added regeneration agent comprises at least one of sodium bicarbonate, sodium chloride, sodium hydroxide, potassium hydroxide, or potassium chloride.

6. The method of claim 1, wherein the amount of the added regeneration agent is 5-40% of an amount of the modified regeneration solution.

7. The method of claim 1, wherein a number of the plurality of batches is 2-30.

* * * * *